Feb. 19, 1952 W. J. HUSHLEY ET AL 2,586,338
APPARATUS AND METHOD FOR DISPERSING A PHOSPHOR IN A LIQUID
Filed July 1, 1948

WITNESSES:
Edward Michaels
N.w. C. Groome

INVENTORS
Walter J. Hushley &
Richard L. Longini.
BY
Hyman Diamond.
ATTORNEY

Patented Feb. 19, 1952

2,586,338

UNITED STATES PATENT OFFICE 2,586,338

APPARATUS AND METHOD FOR DISPERSING A PHOSPHOR IN A LIQUID

Walter J. Hushley and Richard L. Longini, Pittsburgh, Pa., assignors to Westinghouse Electric Corporation, East Pittsburgh, Pa., a corporation of Pennsylvania Application July 1, 1948, Serial No. 36,548

3 Claims.  (Cl. 259—81)

This invention relates generally to methods and apparatus for dispersing powdered phosphor in a liquid containing a binder for the phosphor, and more particularly to methods and apparatus for producing uniform and non-conglomerate dispersions of phosphors in liquid without impairing the luminous properties of the phosphors.

When a fluorescent screen is made by settling powdered phosphor in a liquid which contains a binder, the phosphor particles normally form conglomerates of groups of particles which settle together, and which form a fluorescent screen of non-uniform thickness. Since the thickness of a phosphor layer forming a fluorescent screen is normally of the order of only a few diameters of the order of two of the particles forming the phosphor, the fact that the screen is nonuniform implies the formation of excessively thick layer portions, as well as of large holes in the screen. These thick layers and holes are of such magnitude as to produce in non-uniform luminescence, and is in high degree undesirable.

Two methods of breaking up the conglomerates are known in the art, and are conventionally employed, namely (1) grinding and (2) shaking. It is found that shaking is not effective in completely breaking up the conglomerates, while grinding, which is quite effective in breaking up the conglomerates has, as presently practiced in the art, the effect of breaking up or damaging the individual phosphor crystals or particles, and thereby reducing the luminous efficiency of the phosphor.

We have discovered that phosphor particles may be adequately dispersed without reduction of luminous efficiency by rolling the mixture in a bottle containing a cylindrical or spherical dispersing member fabricated of plastic material. Because the dispersing member is fabricated of plastic material, and is therefore soft compared with materials such as glass or porcelain, the surface of the dispersing member is insufficiently hard to break or damage individual phosphor crystals or particles. The particles are distributed by the pressure exerted by the weight of the plastic cylinder. Since the cylinder is of low density it is buoyed up by the liquid and the pressure which it exerts is comparable to pressure exerted in a kneading operation. It has been found, by experiment, that glass cylinders or balls damage phosphor crystals sufficiently to reduce substantially their luminous efficiency, whereas cylinders or balls fabricated of plastic material do not, which indicates that the desired property is a function of the surface hardness of the dispersing cylinder or ball, the weight of the plastic ball or cylinder being properly selected for the purpose of dispersing the conglomerates.

The use of glass, quartz, porcelain or the like, for the dispersing elements, introduces grinding of the phosphor crystals, which are soft and fragile in comparison with glass, quartz or porcelain. By utilizing dispersing members which have softer surfaces than the phosphor crystals or particles, the grinding action is eliminated completely, only a masticating or kneading action taking place, and the individual phosphor crystals or particles remain undamaged by the dispersing action applied to the conglomerates.

It is, accordingly, an object of the present invention to provide a novel and improved method and apparatus for dispersing conglomerates of phosphor in liquid.

It is a further object of the present invention to provide a method and apparatus for masticating conglomerates of phosphor crystals without grinding the individual crystals forming the conglomerates.

It is still a further object of the invention to provide a method of dispersing conglomerates of phosphor particles by subjecting the conglomerates to rolling action of dispersing elements having smaller surface hardness than the hardness of the particles forming the conglomerates.

It is a broad object of the invention to provide a method and apparatus for effectively dispersing conglomerates of phosphor particles without reducing thereby the luminous efficiency of the particles.

Briefly described, the present invention provides a method and an apparatus for dispersing phosphor particles throughout a settling liquid, without reducing the luminous efficiency of the crystals, by rolling a mixture of the phosphor crystals and the settling liquid in a bottle containing a cylinder, or balls, which are fabricated of plastic material. The plastic material may be polystyrene, for example, although other plastic materials may be used with excellent results. In general, plastic material is utilized because of its soft surface, which is incapable of exerting a grinding action on the phosphor crystals. The cylinder, or the balls, are selected to have a weight adequate to reduce or break up the conglomerate masses of phosphor particles which are normally present when powdered phosphor is introduced into the settling liquid, or when settling liquid is added to a mass of powdered phosphor particles, and the process of reducing or breaking up the conglomerate masses may best be described as a masticating or kneading process, without accompanying grinding.

More specifically, we may introduce into a bottle a quantity of binder solution or settling liquid. The binder solution or settling liquid may comprise in one specific mode of practicing our invention, a 2% solution of potassium silicate. Phosphor powder may then be added, in suitable amount, one example of a suitable electron phosphor being ZnS:CdS, or zinc-cadmium sulphide, having particles of about six microns in diameter. A small cylinder, fabricated of polystyrene, or similar synthetic resinous materials may then be introduced into the bottle, and the bottle may be rolled or rotated until complete dispersion is effected, or for about one hour, at an extremely slow rate, i. e., about ten revolutions per minute. It will be obvious that other binders and phosphors may be utilized, with excellent results, and the example provided above is therefore in no sense to be construed as limiting, but rather by way of furnishing a specific example.

After sufficient elapse of time, the kneading and masticating action of the plastic cylinder on the conglomerate masses of phosphor particles completely disperses these particles in the liquid, resulting in an extremely uniform mixture the phosphor content of which is in the form of extremely fine particles, of luminosity undiminished by the dispersal process, and corresponding generally in size with the sizes of the individual crystals of the phosphor powder originally introduced into the solution. Such crystals may have been bound together by the flux, for example, sodium chloride, when the phosphor was originally formed. The plastic masticator together with the dissolving water separate the individual crystals from the flux.

The dispersed phosphor provided by our improved process may be poured and settled on a screen which is to be made fluorescent, the liquid decanted, and the screen subjected to a drying operation, which fixes the layer of phosphor adhering to the surface after decanting. The resulting fluorescent screen or surface is extremely uniform, and of high luminous efficiency.

The true spirit and scope of our invention will be defined in the appended claims, in accordance with the requirements of the statutes relating to Letters Patent of the United States. For a clear understanding of our invention reference is made to the following detailed description of a specific embodiment and example of the invention, especially when taken together with the accompanying drawing, wherein:

Figure 1:
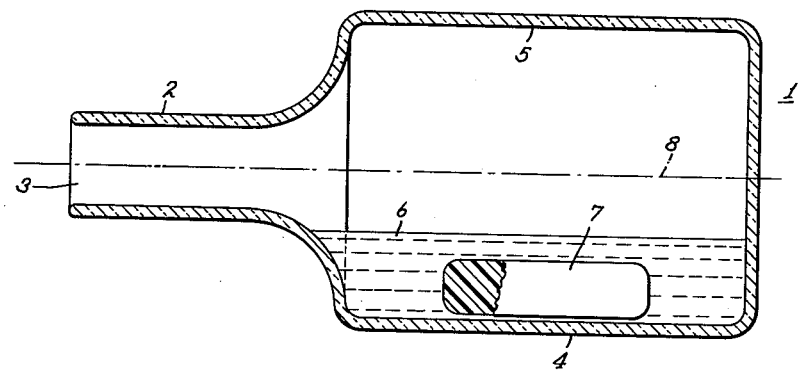
Figure 1 is a view in longitudinal section of an equipment adapted for practicing our invention.

Referring now specifically to the drawing, the reference numeral 1 denotes a bottle, flask, or other container, which may be fabricated of quartz, glass or the like vitreous material, or of plastic material if desired. The container 1 may comprise a relatively narrow cylindrical neck 2, having an opening 3 through which material may readily be introduced into the container 1, and a generally cylindrically body portion 4 co-axial with the cylindrical neck 2 and of diameter approximately equal to its height. The diameter of the body portion 4 may be several times the diameter of the neck 2, and the inner cylindrical wall 5 of the body portion 4 may conform accurately to the outline of a right circular cylinder, having an axis co-linear with the axis of the neck 2.

In the practice of our invention, a sufficient quantity of binder liquid may be poured into the container 1 via the opening 3, so that upon orienting the container 1 with its axis in a horizontal plane none of binder will return from the container via the neck 2, or otherwise described, so that the level of the binder is substantially below the level of the neck 2.

A suitable quantity of phosphor powder is now introduced into the container 1, the quantity being selected in accordance with conventional practices, to form a mixture 6, and a right circular cylinder 7 is further introduced into the container 1, the cylinder 7 being fabricated of a plastic material, such as polystyrene, or other, synthetic resinous material having low surface hardness of an equivalent order, and having a height substantially less than the height of the body portion 4 of the container 1, and a diameter adequately small to enable insertion into the container 1 via the neck 2.

The binder itself may comprise a 2% solution of potassium silicate, for example, it being understood that other binders are known to those skilled in the art, which may be utilized, the specific character of the binder not going to the essense of the invention. The electron phosphor may be, for example ZnS:CdS, or zinc-cadmium sulphide, having particles about 6 microns in diameter, although other suitable phosphors are known to the art, and may be utilized in the practice of the invention.

We have found, utilizing a sixteen ounce bottle, half full, that the dispersing cylinder 7 may have a diameter of one inch and a length of two inches, for satisfactory results. The dimensions of the cylinder are not, however, in any sense critical, and in fact, we have found that a plurality of balls may be utilized instead of a single cylinder, or that a plurality of cylinders may be employed, with good results, it being merely essential that the dispersing member or members, of which cylinder 7 is merely an example, whether plural or single, spherical or cylindrical, have sufficient weight to knead or masticate conglomerates formed in the binder, but have insufficient weight to crush the phosphor particles and insufficient surface hardness to grind, abrade, or break the phosphor particles.

The container 1 may now be oriented with its axis 8 substantially horizontal, and rotated, in any convenient manner or by any convenient mechanism (not illustrated) slowly and gently, until complete dispersion has been effected. In the specific example provided hereinabove, a rotational rate of ten revolutions per minute for one hour was successfully employed. The time values given are not critical, however, and depend upon a wide variety of factors including the character of the binder and of the phosphor, the relative proportions of each utilized, and the physical dimensions and general characteristics of the container and the dispersing members. It is not essential, moreover, that a container of the general shape illustrated and described be employed, or that pure rotary motion be employed, oscillatory motion being also suitable.

It is essential, however, that the relative motion between the liquid and the dispersing member or members be gentle and slow, to avoid damage to the phosphor particles, which reduces their luminosity, and that the motion be continued for a sufficient period to accomplish complete and even dispersion of the phosphor powder.

Figure 2:
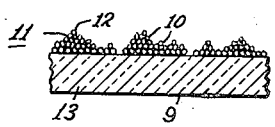
Figure 2 is a transverse section taken through a fluorescent screen having an inadequately dispersed phosphor coating.

Reference is made to Figure 2 of the drawing, which illustrates a fluorescent screen 9 formed of agglomerated or insufficiently dispersed phosphor. It will be observed that the deposition of phosphor, as illustrated by the irregularly shaped particles 10 is extremely uneven, or of irregular thickness, and that holes appear wherein binder 11 exists, but no phosphor particles 10, as well as portions of considerable thickness, 12, containing an undue quantity of phosphor. The presence of holes containing no phosphor, which occurs when the fluorescent layer is of an average thickness of only a few particle diameters, is particularly serious, since thereby visual images created on the face of the fluorescent screen are discontinuous particularly as to fine details and uneven in texture. The unevenness in texture arises because the exciting electrons produce no light when they strike the holes and the light which they do produce when they strike the inner surfaces of the conglomerates is largely reflected inwardly (opposite the direction of the electron flow) by the conglomerates.

Figure 3:
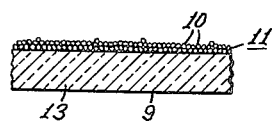
Figure 3 is a transverse section taken through a fluorescent screen having an adequately dispersed phosphor coating, prepared in accordance with the present invention.

Figure 3 illustrates a highly enlarged cross section taken through a fluorescent screen 9 having a base 13 and a layer of phosphor particles 10 in a binder 11, formed in accordance with our invention, and showing the evenness of the layer and the lack of holes therein. The fluorescent screen shown in Figure 3 is of desirable character. Fluorescent liquid for producing screens of the desirable character of that illustrated in Figure 3 may be produced in accordance with the present invention, without, however, effecting breakage, abrasion and grinding of the individual phosphor particles, and hence without loss of luminous efficiency, such as results with the methods and apparatus and heretofore employed in the art.

While we have described and illustrated one specific embodiment of our invention, it will be clear that modifications of our method and apparatus may be resorted to without departing from the true spirit thereof.

What we claim and desire to secure by Letters Patent of the United States is:

1. A method of dispersing conglomerates in a mixture of zinc-cadmium-sulphide phosphor particles and a liquid consisting essentially of a 2 per cent water solution of potassium silicate without substantial reduction of luminosity of said phosphor particles, comprising, inserting said mixture in a container having a generally cylindrical inner surface, inserting into said cylinder at least one cylindrical member having the cylindrical surface thereof formed of polystyrene, and gently rotating said container about the axis of said cylindrical inner surface at about ten revolutions per minute for a time period of about an hour to disperse the particles of said conglomerates.

2. A mixing apparatus comprising a container containing a mixture of phosphor particles and settling liquid partially filling said container, and a mechanical element for dispersing said phosphor particles throughout said settling liquid, said mechanical element having a circular cross-sectional area and being fabricated of synthetic resinous material.

3. A mixing apparatus comprising a container having a cylindrical shape and a substantially circular cross section containing a mixture consisting essentially of zinc-cadmium-sulphide particles in a 2 per cent water solution of potassium silicate partially filling said container, and a mechanical element for masticating conglomerates of said particles without substantial mechanical destruction of said particles, said mechanical element being located internally of said container and comprising a cylinder fabricated of polystyrene.

WALTER J. HUSHLEY.
RICHARD L. LONGINI.

REFERENCES CITED

The following references are of record in the file of this patent:

UNITED STATES PATENTS

| Number | Name | Date |
|---|---|---|
| 1,807,383 | Carnahan | May 26, 1931 |
| 1,860,811 | Little et al. | May 31, 1932 |
| 2,185,158 | Price | Dec. 26, 1939 |
| 2,203,430 | Goldberg et al. | June 4, 1940 |
| 2,350,534 | Rosinger | June 6, 1944 |